M. P. NOEL.
HAND CORN-PLANTER.
No. 171,841. Patented Jan. 4, 1876.
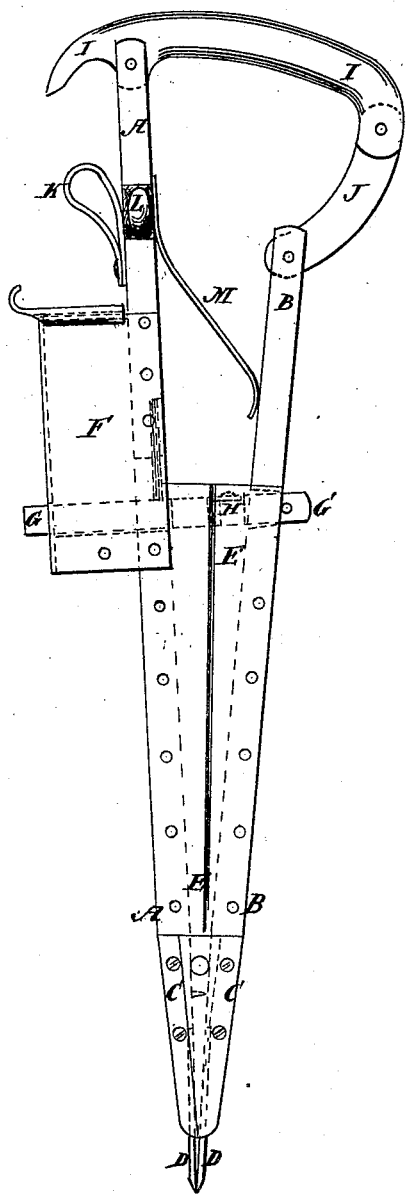
WITNESSES:
E. Wolff
Alex F. Roberts
INVENTOR:
M. P. Noel
BY
ATTORNEYS.

UNITED STATES PATENT OFFICE.

MILTON POLLOCK NOEL, OF ST. CLOUD, MINNESOTA.

IMPROVEMENT IN HAND CORN-PLANTERS.

Specification forming part of Letters Patent No. 171,841, dated January 4, 1876; application filed October 16, 1875.

*To all whom it may concern:*

Be it known that I, MILTON P. NOEL, of St. Cloud, in the county of Stearns and State of Minnesota, have invented a new and useful Improvement in Hand Corn-Planter, of which the following is a specification:

The figure is a side view of a hand corn-planter illustrating my invention.

The object of this invention is to furnish an improved corn-planter which shall be so constructed that the operator can operate it and plant the corn as rapidly as he could walk over the ground with a cane.

The invention consists in applying a loop to serve in conjunction with the handle to facilitate manipulation, and in a side handle that is used in connection with the jointed handle, all as hereinafter described.

A and B are the two plates or bars of the planter, which are pivoted to each other by pivots passing through the overlapping plates C, attached to their lower ends. To the lower ends of the bars A B are attached steel plates D, to enter the ground and open it to receive the seed. To the edges of the bars A B are attached strips E, of leather or other flexible material, extending from the overlapping plates C to the hopper F, to form a guide-spout for the seed. The hopper F is attached to the outer side of the upper part of the bar A, and the seed is removed from it and dropped by the slide G, which passes into the lower part of said hopper through a hole in the bar A, and the outer end of which is attached to the other bar, B. The seed is carried out by a hole in the slide G, the size of said hole being regulated as required by a small plate, H, attached to the said slide G. To the upper end of the bar A is pivoted a handle, I, near one end, and which is so formed that it may be conveniently grasped in the hand. The other end of the handle I is pivoted to the upper end of a short connecting-bar, J, the lower end of which is pivoted to the upper end of the bar B, so that the planter can be operated to drop the seed, and to close the jaws or plates D, to enter the ground, by means of the handle I and bar J. To the outer side of the bar A, a little below the end of the handle I, is attached a loop, K, of leather or other suitable material, to receive a finger of the hand that grasps the handle I, to give the operator more perfect control of the planter. To the edge of the bar A is attached a rigid handle, L, which may be grasped by the operator with one hand, while he grasps the handle I with his other hand when he wishes to use both hands. M is a spring interposed between the upper parts of the bars A B, one end of which is attached to one of said bars, and its other end rests against the other bar. The spring M is designed to hold the plates D together while being forced into the ground, and while the machine is being carried.

Having thus described my invention, I claim as new and desire to secure by Letters Patent—

1. The combination, with pivoted handle or bar I, of the loop K, arranged as and for the purpose set forth.

2. The combination, with plates A B, of bars I J, loop K, handle L, and spring M, all arranged and operating as and for the purpose specified.

MILTON POLLOCK NOEL.

Witnesses:
JOHN M. RUSENBERGER,
GERHARD LIESER.